United States Patent [19]

Baumans et al.

[11] 4,313,172
[45] Jan. 26, 1982

[54] APPARATUS AND METHOD FOR MEASURING THE ROUGHNESS OF LUMBER

[75] Inventors: Hans W. Baumans, Outremont; Julian S. W. Tuck, Como; Mohammad Ahmad, Ville Lemoyne; Chon T. Le Dinh, Brossard; Victor Pinheiro, Sainte-Foy, all of Canada

[73] Assignee: Centre de Recherche Industrielle du Quebec, Quebec, Canada

[21] Appl. No.: 45,086

[22] Filed: Jun. 4, 1979

[51] Int. Cl.³ .............................................. G01B 5/28
[52] U.S. Cl. ...................................... 364/563; 73/105; 356/237; 364/507
[58] Field of Search ............... 364/468, 475, 552, 554, 364/563, 507, 562; 33/15; 73/104, 105; 356/237

[56] References Cited

U.S. PATENT DOCUMENTS

| | | | |
|---|---|---|---|
| 3,544,774 | 12/1970 | Peklenik | 73/105 |
| 3,931,501 | 1/1976 | Barr et al. | 364/475 |
| 3,983,371 | 9/1976 | Siranni et al. | 364/507 |
| 4,009,376 | 2/1977 | Faraguet | 364/563 |
| 4,017,976 | 4/1977 | Barr et al. | 33/1 S |
| 4,163,321 | 8/1979 | Cunningham | 364/475 |
| 4,200,986 | 5/1980 | Ackerman et al. | 73/105 |
| 4,206,633 | 6/1980 | McKechnie et al. | 73/105 |
| 4,213,331 | 7/1980 | Porter | 73/105 |

OTHER PUBLICATIONS

Underwood et al.; "The Surfagage-An Instrument for Roughness Measurement"; Research Labs. Div.-Gener'l Motors Corp.; Mar. 1952.
"The Profilometer"; Physicists Research Company; Ann Arbor, Mich.; Jun. 1947.

Primary Examiner—Errol A. Krass
Attorney, Agent, or Firm—Alan Swabey; Robert Mitchell; Guy Houle

[57] ABSTRACT

A method and an apparatus for automatically measuring the thickness and the roughness of elongated articles, such as wooden boards. The device comprises a housing having an opening therethrough to receive at least a portion of a board to be measured. At least one contact probe is provided in the housing and is biased against at least one surface of the board to sense irregularities in the flatness of the surface along a measured length thereof. A measuring circuit is connected to the contact probe to provide a measurement signal representative of the sensed irregularities and variations in thickness. A distance measuring device is also provided in the housing to measure the distance of displacement of the board past the contact probe. An output display means indicates selected ones of the measurements obtained. A computing means accumulates measured values of the means, minimum and maximum thickness, for a group of boards and permits the extraction of such statistical information.

20 Claims, 6 Drawing Figures

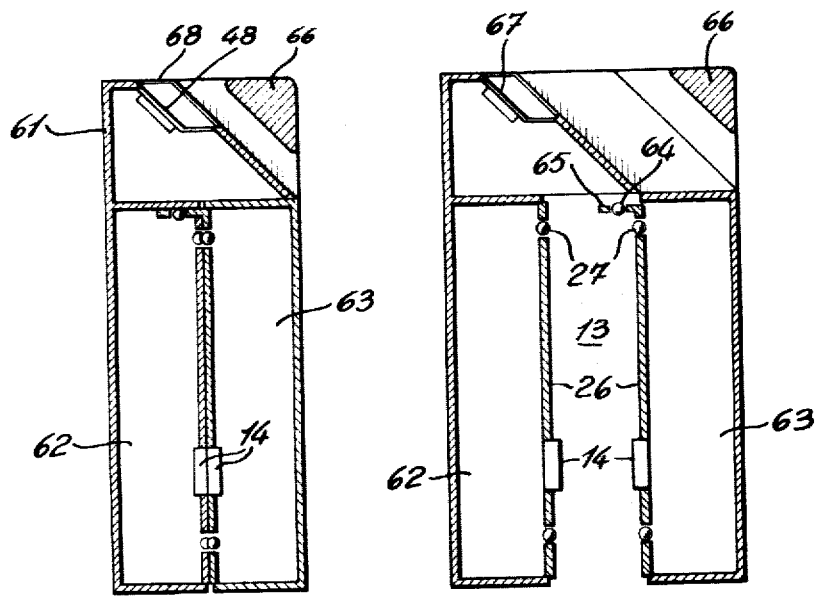
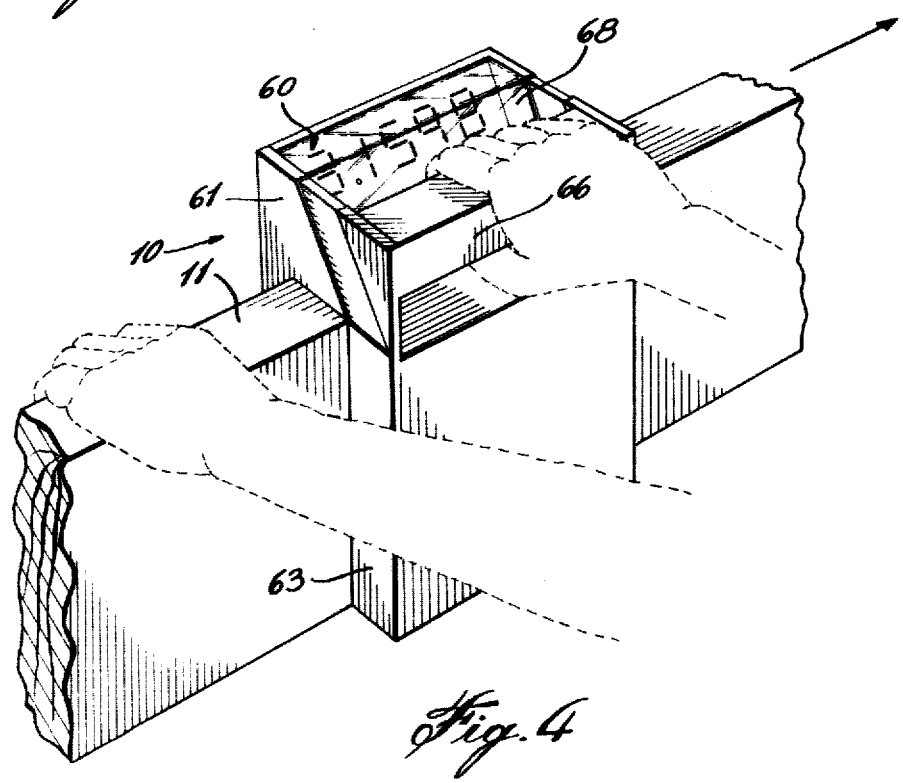

APPARATUS AND METHOD FOR MEASURING THE ROUGHNESS OF LUMBER

BACKGROUND OF INVENTION (a) Field of the Invention

The present invention relates to a method and an apparatus for automatically measuring the thickness and roughness of wooden boards and, more particularly, but not exclusively, to a portable type apparatus for such use.

(b) Description of Prior Art

In the production of lumber, it is necessary to cut logs into usable boards which are then planed to remove irregularities therefrom resulting from the wear and tear of the saw blade. The sawdust produced in saw mills is considered an undesirable residue because of its low value as compared to wood chips which can be used in the production of building material. An analysis of saw mills has shown that the rough lumber produced has considerable thickness variation and data has revealed that the thickness of boards can vary, on the average, between 0.06 inch and 0.21 inch. The majority of the saws used are circular saws and the cutting edges of the saw are subjected to considerable wear due to the nature of the logs being cut and the heating of the blade. Thus, rough lumber is produced with substantial irregularities in the cut surface thereof. It is, therefore, necessary to plane such irregularities which result in an increased loss of lumber. As stated above, investigation has shown that the loss of lumber is approximately 0.15 inch in the width of the saw blade cut. This is considerable when taking into account that a log of 12 inch diameter is capable of producing approximately ten separate 1 inch boards in its cross-section. This means a loss of at least one board on such a log.

The above problem can be minimized by ensuring that the saw blade is always properly adjusted and that the cutting edge is in good condition whereby to maintain the saw cut substantially straight and of a minimum width and with minimum undulations or irregularities along its cut length.

The planing of such irregularities is also a time-consuming process which adds to the cost of the production. Also, the narrower the width of the saw cut, the less sawdust produced and the less loss of lumber. A great deal of attention is being given to the reduction of the saw blade thickness so that the width of the cut is further reduced whereby the production of sawdust is also reduced. However, the sawing accuracy, that is, maintaining the saw blade along an intended line of cut as closely as possible, is another factor which should be taken into consideration to minimize the irregularities or roughness in the lumber.

Various types of measuring apparatus have been developed in an attempt to measure the roughness, or thickness of the lumber, as it is cut in the sawmill. It is known to provide a gauge consisting of hand-held spring arms with an electric resistance strain gauge adapted thereto and to measure a piece of lumber at selected intervals of lengths therealong. In one attempt to solve this problem, a panel truck was fitted with equipment for sensing thickness by probes similar to the spring arms and resistance strain gauge arrangement mentioned above. Lumber was passed through slots in the side of the truck and five pairs of probes in the truck sensed thickness at five positions across the width of each board. The vehicle contained paper tape punches for recording data. However, such apparatus do not continuously sense the lumber thickness along a predetermined length thereof and preferably from end to end. Also, such apparatus could give false readings if a knothole or a wood chip hole is accidentally measured by one of the probes.

SUMMARY OF INVENTION

It is therefore a feature of the present invention to provide a method and an apparatus for continuously sensing lumber thickness to detect any variation in thickness therealong and to store such information to provide desired measurements of the thickness and roughness of measured lumber.

It is a further feature to provide an automatic apparatus which can measure lumber at high speed whereby all or a substantial portion of the lumber coming from the output of a saw can be passed through the apparatus without slowing the flow of lumber through the mill.

It is a further feature to provide an apparatus that can store the measured data of all the lumber measured and perform the necessary calculation to provide all the data in various statistical forms.

It is a still further feature to provide an apparatus which is easy to use and requires very little time to adapt to lumber pieces and which is portable whereby lumber already cut and stacked can selectively be measured.

It is also a feature to provide an apparatus that can detect knotholes or other forms of irregularities not resulting from any processing operation on the surface of the boards which would give false values of minimum or maximum board thickness.

It is a still further feature to provide an apparatus which can provide substantially instantaneous readout to permit adjustment to a saw blade to be made continuously to minimize deviations along an intended line of cut resulting in the loss of lumber, and to indicate the replacement period for the saw blade.

Another feature of the present invention is to provide an automatic measuring method and system which will provide a readout of the average, maximum and minimum board thickness, the average board roughness and indicate the number of boards measured by the apparatus.

A still further feature of the present invention is to provide an apparatus which is compact, easy to use, economical, and capable of being used in a dust filled environment and which requires simple instructions for use.

According to the above features, from a broad aspect, the present invention provides a device for measuring irregularities in the thickness of elongated articles, such as wooden boards. The device comprises a housing having aperture means to receive at least a portion of a board to be measured therethrough. A pair of contact probes are provided in the housing and each biased against a respective one of opposed surfaces of the board to sense irregularities and the flatness of the said surfaces along a measured length thereof. Measurement means is connected to the contact probes to provide a measurement signal representative of the sensed irregularities. Each probe is secured to a respective one of a pair of spaced support arms biased toward each other. The measurement means is a linear measurement device associated with both the support arms whereby transverse displacement of the contact probes will be transferred to the measurement means to produce an output linear signal representative of the displacement of both probes. Translatory means is further provided for measuring the distance of displacement of the board and to provide reference signals at predetermined intervals of length along the distance of displacement to permit an electronic processing circuit means to obtain a measurement signal to the irregularities of each of the reference signals. Output display means is provided to display desired obtained measurements.

According to a further broad aspect of the present invention, there is provided a method of automatically measuring irregularities in the thickness of elongated wooden boards. The method comprises the steps of causing relative displacement of an elongated board to be measured with respect to a pair of contact probes. Opposed parallel faces of the board are contacted with a respective one of the two contact probes. The transverse displacement of each probe is measured relative to its respective one of the opposed parallel faces to provide a measurement signal representative of irregularities in the thickness of the elongated board. Simultaneously, the length of the elongated board is measured with a translatory device to measure the distance of displacement of the elongated board. A reference signal is provided at each one of predetermined intervals of length along the measured length to permit an electronic processing circuit means to obtain a measurement signal of the irregularities at each reference signal.

BRIEF DESCRIPTION OF THE DRAWINGS

A preferred embodiment of the present invention will now be described with reference to the example thereof as illustrated in the accompanying drawings in which:

FIG. 4 is a perspective view showing the device in use;

FIG. 5 is a cross-section view of an example of the construction of the device in its stored position; and FIG. 6 is a cross-section view showing the device in its operating position.

DESCRIPTION OF PREFERRED EMBODIMENTS

Figure 1:
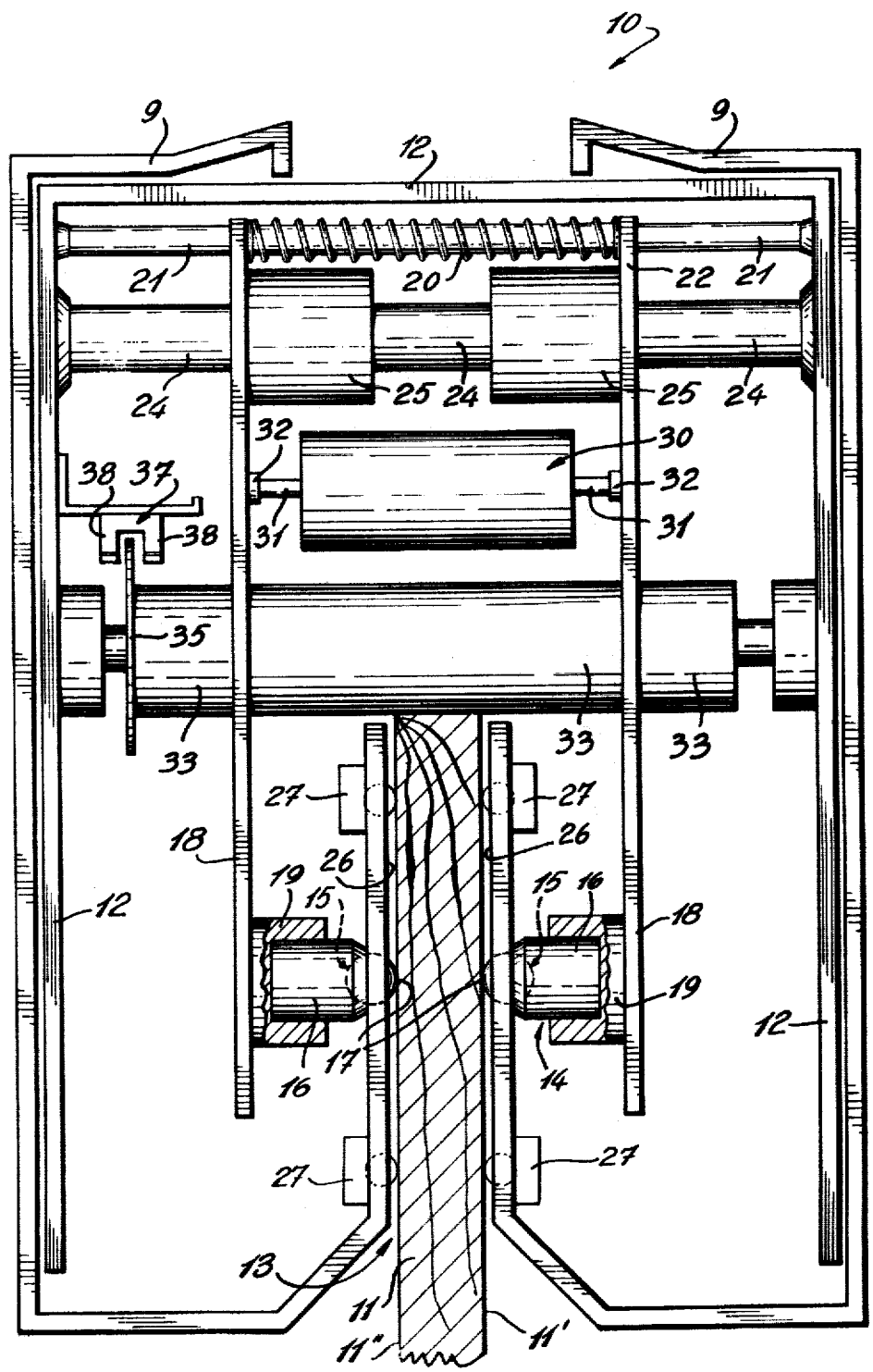
FIG. 1 is a section view, partly fragmented, of the device for measuring the thickness and roughness of wooden lumber.
Figure 2:
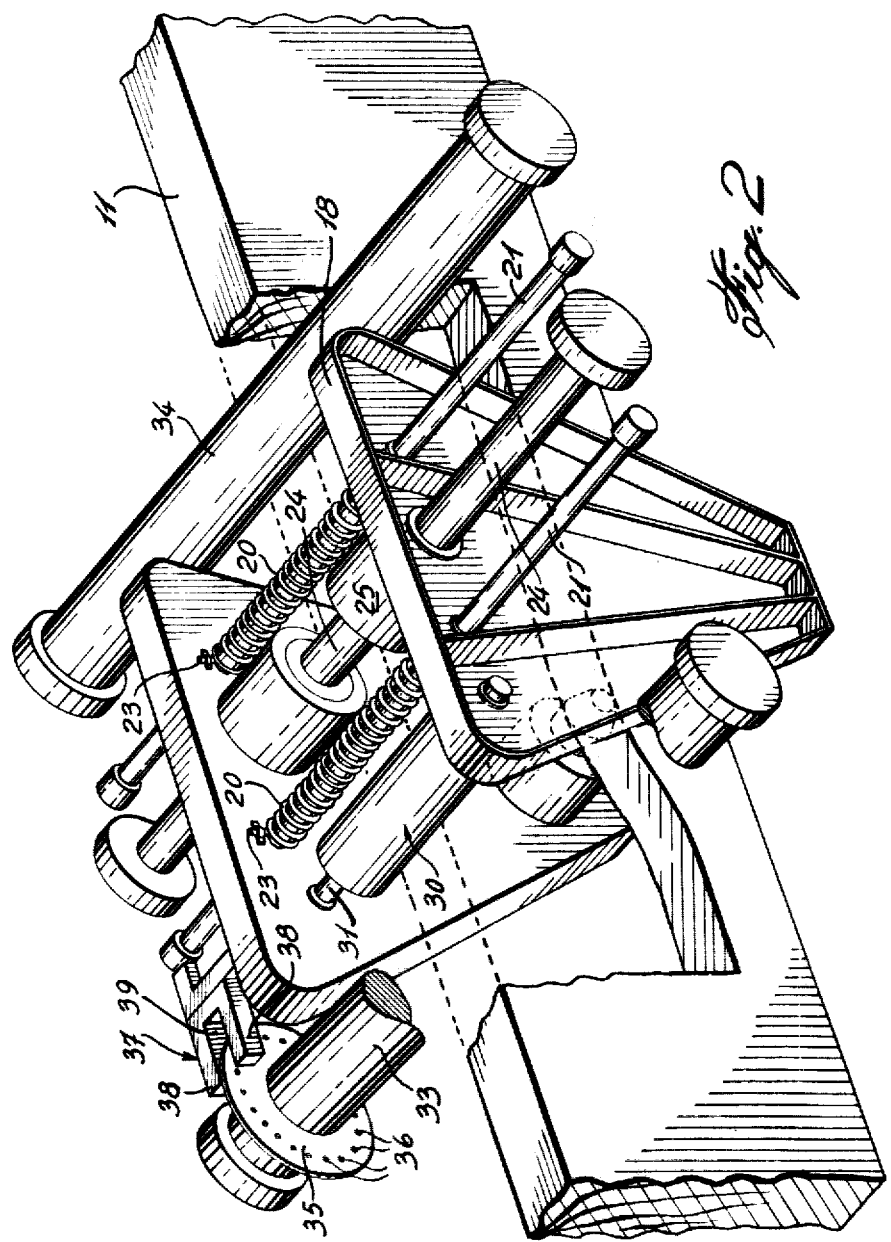
FIG. 2 is a partly fragmented perspective view showing some of the parts of the device of FIG. 1.
Figure 3:
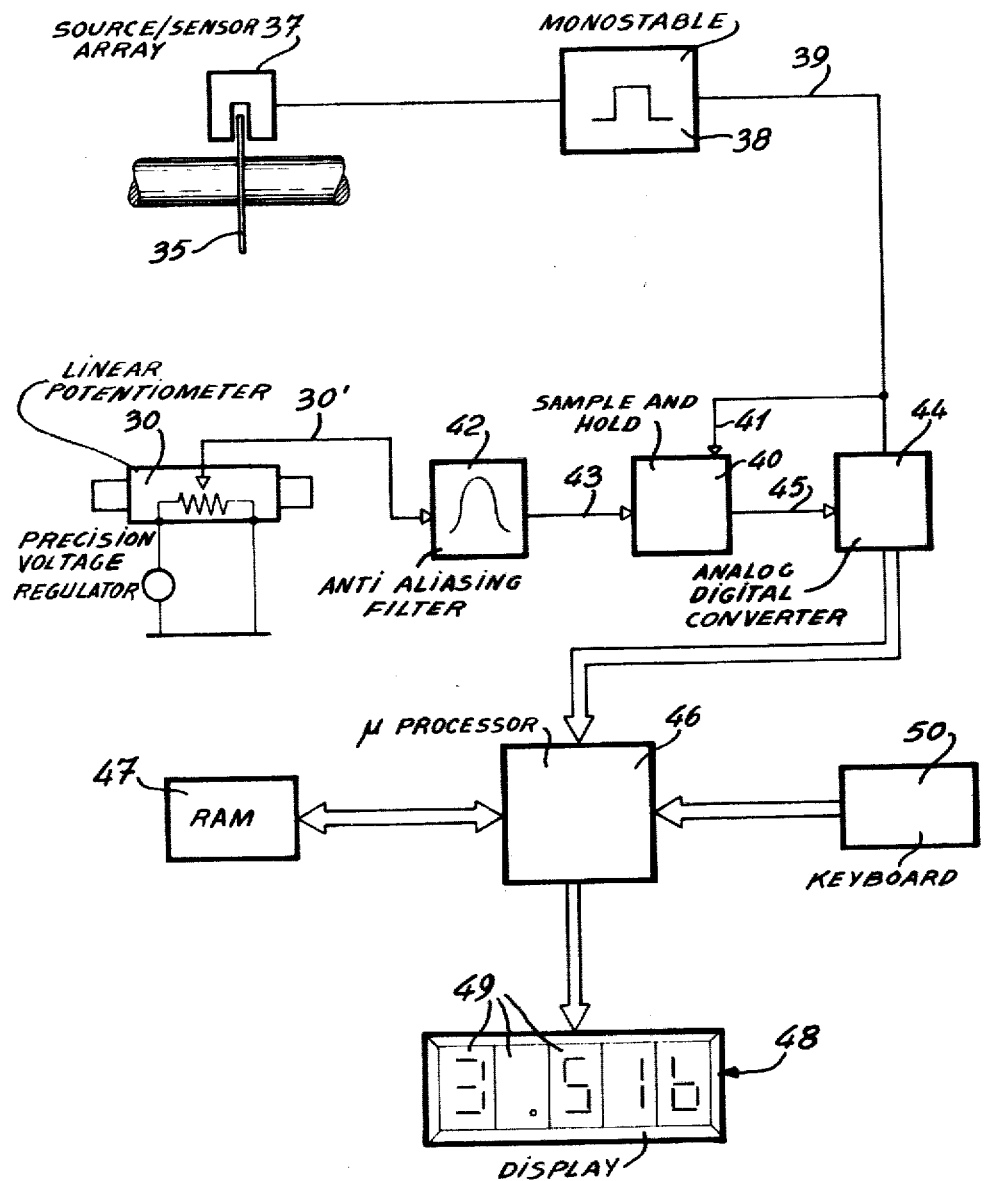
FIG. 3 is a block diagram illustrating the system of measuring the thickness and roughness of the device.

Referring now to the drawings, and more particularly in FIGS. 1 to 3, there is shown generally at 10, the device of the present invention for measuring the thickness and roughness of wooden boards 9. The device comprises a housing 9 having a frame 12 therein for supporting the various component parts of the device. Aperture means, in the form of an adjustable slot 13 is provided in a bottom portion of the housing 11 and adapted for receiving boards 11 of varying thicknesses therethrough. A pair of contact probes 14 are secured with each probe on a respective side of the aperture 13. These contact probes 14 constitute sensing means and other forms of sensors may be used such as photoelectric sensors or other forms of contact sensors.

Each contact probe 14 consists of a ball 15 being captive in a probe housing 16 whereby a rolling contact point portion 17 protrudes out of the housing 16 in a forward portion thereof to engage a respective surface 11' or 11" of the board 11.

Each probe housing 16 is secured to a lower portion of a respective one of a pair of spaced support arms 18 by the intermediate of a securement bracket 19. The support arms 18 are biased towards one another by two springs 20 wound about a respective guide pin 21 and which passes through both support arms 18 at an upper end 22 thereof. The springs are each secured at each end 23 thereof to a respective one of the support arms 18. This is more clearly illustrated in FIG. 2 and it can be seen that the support arms 18 are constructed as plates. The arms 18 are maintained substantially parallel to one another by the guide pins 21 and the provision of a guide bearing shaft 24 passing through the plates near the center in an upper part thereof. Linear guide bearings 25 are secured at one end to a respective support arm 18 and mounted on the shaft 24 for sliding displacement thereon. These linear bearings are constructed so that sawdust or other forms of dust does not hinder their operation to ensure proper displacement on the guide bearing shaft 24.

Biasing means (not shown) is provided to bias the inner face plates 26 of the housing 11 toward one another to form a variable aperture to receive boards of various thicknesses to be measured. Guide bearings 27 are provided in the upper and lower part of the inner face plates 26 to maintain the face plates 26 substantially parallel to their respective surfaces 11' and 11" of the board 11. Thus, the rolling contact point portion 17 of the probes 14 will be properly positioned against their respective board surfaces whereby to sense irregularities in the flatness of the surfaces along a measured length thereof.

The irregularities in the flatness of the surfaces 11' and 11" are measured by measurement means constituted by a linear measurement device, herein a linear motion potentiometer transducer 30. The transducer 30 has a pair of opposed displaceable arms 31 having a free end 32 connected to a respective one of the support arms 18 whereby transverse relative displacement of the arms 18, and consequently the probe contact point 17, will be transferred to the potentiometer transducer to produce a translatory linear signal representative of the displacement of both probes 14 to provide a measurement of the thickness of the board 11 and the roughness thereof. The processing of the linear signal will be described later with reference to FIG. 3.

Referring now more particularly to FIG. 2, there is shown a translatory means in the form of a cylinder roll 33 to measure the distance of displacement of the board 11 with respect to the contact probes 14. Other types of presence detectors, such as inductive, magnetic, capacitive may be used. The cylinder roll 33 is positioned transverse to the plane of the support arms 18 and is frictionally engaged with the upper edge 34 of the board 11 whereby as the board or the housing 11 is displaced through the aperture slot 13, the cylinder roll 33 will roll on the upper edge 34 and provide a measurement of the measured length of the board, that is to say, the length of displacement of the board through the housing 11. Other suitable wheel-type elements could be used to provide this measurement and it need not engage with the upper edge of the board but could be arranged differently as long as it provides a contact with the board to measure the displacement thereof. As herein shown, the cylinder roll is positioned in a top end of the aperture slot 13 and a further idler cylinder 34 is disposed in a common plane with the cylinder roll 33 to maintain the probes in substantial alignment with a longitudinal axis along the measured length of the board 11. The idler cylinder roll is also in frictional rolling contact with the top edge 32 of the board and its purpose is to maintain proper support of the device on the board.

Referring again to the cylinder roll 33, there is shown a flat circular disc secured near an end of the roller 33 and rotatable therewith. The disc 35 is provided with a plurality of equidistantly spaced apart light transmitting apertures 36 on a circumferential axis thereof, which axis is aligned with a light beam (not shown) extending in a velocity sensor device 37. The velocity sensor device 37 is provided with two spaced-apart parallel arms 38 defining a slot 39 therebetween and through which a circumferential portion of the disc 35 extends. In one of the arms 38, there is provided a light source (not shown) to produce the light beam in alignment with the apertures 36. In the other arm 38, a photocell (not shown) is secured to detect the presence of the light beam when it passes through one of the apertures. Each time the light beam is detected, the photocell provides a reference signal. Thus, it can be seen that as the cylinder roll 33 is displaced along a measured length, a plurality of these reference signals will be provided at pedetermined intervals of length whereby to serve as a reference to identify the location of the measurement linear signal, provided by the linear potentiometer transducer 30, at predetermined points along the measured length of the board. Accordingly, a correlation of the linear signals can be made whereby to analyze the physical shape of the thickness and roughness of the board along its measured length.

Referring now to FIG. 3, there is shown the system or electronic processing circuit means which processes the linear signals and reference signals to reproduce desired results of the measurements. As shown, the velocity sensor 37 and, more specifically, the output of the photocell (not shown) therein, feeds a monostable circuit means 38, well known in the art, to produce reference signal pulses on the output 39 thereof. This reference signal pulse is fed to a clock input 41 of a sample and hold circuit 40. The output signal from the linear motion potentiometer transducer 30 is connected to an anti-aliasing filter 42, which is also well known in the art. The output of the anti-aliasing filter 42 is connected to the signal input 43 of the sample and hold circuit.

The reference signal on the output 39 of the monostable circuit 38 also feeds the clock input of an analog to digital converter 44 whereby to correlate an information signal received on its input 45. This information signal is the sample value of the output linear signal of the potentiometer transducer 30 at the precise reference signal time of each reference output signal. Therefore, the information signals can be correlated to an exact location on the measured length.

The analog/digital converter 44 provides an output measured signal to an input of a microprocessor circuit 46. For this particular embodiment of the circuitry, the microprocessor 46 is a Rockwell (PPS-4/1). The microprocessor feeds a RAM memory storage circuit 47 and the information therein is fed to an output display means herein constituted by a digital display 48 and consisting of a plurality of light emitting diodes 49. A keyboard 50 addresses the microprocessor 46 to obtain desired output measurements such as the average board thickness measured, the maximum board thickness measured, the minimum board thickness measured, the average board roughness measured or the number of boards measured.

As an example, the processing of board thickness to give average roughness may be performed by deriving the standard deviation of the discrete roughness measurements. Also, means may be provided in the processing circuits to allow the instrument to recognize and eliminate the effects of knotholes and other gross defects, such that the roughness signal is representative only of small scale irregularities of the board, and not of large point defects.

It can be seen that apparatus and circuitry adapted thereto provides a method of automatically measuring the thickness and roughness of wooden boards by simply causing relative displacement of a board to be measured with respect to the contact probes provided in the housing.

Referring now to FIGS. 4 to 6, there is shown an example of how the device 10 can be constructed to manually effect this relative displacement. As herein shown, the device is constituted by a hand-held portable housing 60 which is displaceable along an edge portion of a board 11 to be measured. FIG. 5 shows the housing 60 in its non-use position whereas FIG. 6 shows the device in its usable position. The component parts of the device are conveniently constructed to fit in such housing, which housing consists of a fixed upper section 61, a fixed wall section 62, and a displaceable, resiliently biased, wall section 63. The contact probes 14 are herein shown in their position on the inner face plates 26 with the guide bearings 27 secured thereto. The translatory device could here be suitably constituted by a wheel-type arrangement instead of a cylinder roll 33 and it could be located in the upper part of the housing on a retractable axle (not shown). Proper guidance of the housing 60 on the top edge of the board could be provided by spaced-apart guide bearings such as 64 mounted on a transverse wall section 65 in an upper part of the aperture slot 13. Thus, when the device is not in use, the aperture slot 13 is completely closed, making sure that no foreign matter is in contact with the measuring elements which protrude thereinto. Because the device is used in a dust-filled environment, it is preferable that the device be constructed for minimum exposure of its measuring elements.

A hand grip 66 is provided in the forward portion of the fixed upper section 61 to displace the displaceable wall section 63 away from the fixed wall section 62. The wall section 63 is spring-biased in a similar fashion as previously described with reference to FIG. 1. Also, a slanted wall section 67 is provided in the fixed upper section 61 and the LED output display 48 is secured thereto for easy visual access. A dust cover 68 is secured thereover.

In operation, the displaceable wall sections 62 and 63 are separated from one another and the edge portion of a board is positioned in the aperture slot 13, as previously described. The housing 60 is then displaced longitudinally along the board and the output display will provide the desired output display of the average board thickness or roughness as the device continues to be displaced along the board. Thus, it can be seen that such a device could be used for trouble-shooting purposes where the output of the saws as used in saw mills can be monitored from time to time and based on the measured results, indicate if the saw blade needs to be adjusted or replaced.

It is also within the ambit of the present invention to provide an apparatus using the method of the invention and which is stationarily mounted at the output of the saws whereby all the lumber is fed thereto and the output signal of the device could provide the necessary input signals to other processing circuits which would provide adjustment signals to control devices which would adjust the saw blade to automatically correct itself to provide minimum board roughness. It is also conceived that more than one contact probe can be provided to sense a surface of a board being measured to give a more precise reading across a larger width of the surface being measured. Also, the device may be adapted to measure surface irregularities in other forms of elongated articles where thickness thereof is required to be maintained substantially constant, such as in plastic or metal extrusion apparatus. It is still further within the ambit of the present invention to provide any obvious modification of the component parts of the device herein disclosed or equivalent circuitry to the system disclosed, provided such equivalent devices or circuits fall within the scope of the claims appended hereto.

We claim:

1. A device for measuring irregularities in the thickness of elongated articles, such as wooden boards, said device comprising a housing having aperture means to receive at least a portion of a board to be measured therethrough, a pair of contact probes in said housing each biased against a respective one of opposed surfaces of said boards to sense irregularities in the flatness of said surfaces along a measured length thereof, measurement means connected to said contact probes to provide a measurement signal representative of said sensed irregularites, each probe being secured to a respective one of a pair of spaced support arms biased toward each other, said measurement means being a linear measurement device associated with both said support arms whereby transverse displacement of said contact probes will be transferred to said measurement means to produce an output linear signal representative of the displacement of both said probes, translatory means for measuring the distance of displacement of said board, and to provide reference signals at predetermined intervals of length along said distance of displacement to permit an electronic processing circuit means to obtain a measurement signal of said irregularities at each said reference signal, and output display means to display desired obtained measurements.

2. A device as claimed in claim 1, wherein said housing is a portable housing displaceable along said at least a portion of said board in frictional rolling contact therewith.

3. A device as claimed in claim 1, wherein said translatory means is a wheel-type element secured in said measurement device and secured for said frictional rolling contact with said board, a flat disc secured to said wheel-type element and rotatable therewith, said disc having light transmitting apertures in a surface thereof to pass a light beam therethrough at predetermined intervals along the circumference of said disc, a photocell detecting the passage of said beam through each said apertures to provide a reference signal at each aperture, said reference signals being representative of predetermined intervals of length along said measured length of said board.

4. A device as claimed in claim 3, wherein each of said contact probes is a ball having a portion thereof being captive and displaceable upon itself in a probe housing, each said probe housing being secured to a lower portion of its respective one of said pair of spaced support arms, said linear measurement device being a linear potentiometer transducer, said potentiometer transducer having a pair of opposed displaceable armatures, each armature being secured to a respective one of said support arms whereby transverse displacement of each said probe housing will be transferred to its respective armature of said potentiometer transducer to produce a translatory linear signal representative of the displacement of both said probes.

5. A device as claimed in claim 4, wherein said electronic processing circuit means is provided in said housing to process said linear signal and reference signals to produce at a digital readout display on said housing a selected desired readout signal converted from stored linear and/or reference signals and representative of any one of the average, maximum, or minimum board thickness measured, or the average board roughness, or the number of boards measured.

6. A device as claimed in claim 1, wherein said housing is provided with a displaceable resiliently biased wall section biased against a fixed wall section, one of said contact probes and associated support arm being secured in said resiliently biased wall section opposite to the other probe secured on said fixed wall section, said aperture means being constituted by a space between said displaceable resiliently biased wall section and fixed wall section when said wall sections are positioned spaced apart.

7. A device as claimed in claim 6, wherein said translatory means is a cylinder roll secured in said housing in a top end of said aperture means and positioned for frictional rolling contact with a top edge of said board.

8. A device as claimed in claim 7, wherein there is provided an idler cylinder roll secured in said housing and disposed in a common plane with said cylinder roll to maintain said probes in substantial alignment with a longitudinal axis along said measured length of said board, said idler cylinder roll being positioned for frictional rolling contact with said top edge of said board.

9. A device as claimed in claim 7, wherein said displaceable resiliently biased wall section is provided with a hand grip means to separate said wall sections to hold them spaced apart, a digital readout display in a top wall of said housing, and spaced guide bearings in opposed faces of each said wall sections for maintaining said wall sections substantially parallel with their respective surfaces of said board to be measured.

10. A method of automatically measuring irregularities in the thickness of elongated wooden boards comprising the steps of
  (i) causing relative displacement of an elongated board to be measured with respect to a pair of contact probes;
  (ii) contacting opposed parallel faces of said board with a respective one of two contact probes, and measuring transverse displacement of each of said probes relative to its respective one of said opposed parallel faces to provide a measurement signal representative of irregularities in the thickness of said elongated board;
  (iii) simultaneously measuring the length of said elongated board with a translatory device to measure the distance of displacement of said elongated board; and
  (iv) providing a reference signal at each one of predetermined intervals of length along said measured length to permit an electronic processing circuit means to obtain a measurement signal of said irregularities at each said reference signal.

11. A method as claimed in claim 10, wherein each said contact probes is associated with a linear measuring means to provide a linear output signal, said reference signal being fed to a sample/hold circuit where said linear output signal is sampled at each occurrence of said reference signal to provide information signals representative of the roughness of said board between said contact probes at each occurrence of said reference signals, and feeding said information signals to a processor circuit to provide a usable output of said information signals.

12. A method as claimed in claim 11, wherein there is further provided the step of processing and storing said information in said processor circuit to produce a digital readout display of a selected desired readout signal converted from stored linear and/or reference signals and representative of any one of the average, the maximum, the minimum board thickness measured, or the average board roughness, or the number of boards measured.

13. A method as claimed in claim 10, wherein said step (iii) comprises engaging a rotary translatory element with an edge of said board, said translatory element having a flat disc secured to a shaft thereof, said disc having light transmitting apertures on a circumferential axis of a surface thereof, directing a light beam on said axis to pass a light beam therethrough at predetermined intervals along the circumference of said disc, detecting the passage of said beam through each said apertures by a photo detector to produce said reference signal at each aperture.

14. A system for measuring irregularities in the thickness of elongated articles, such as wooden boards, said system comprising means to displace a board relative to a pair of contact probes, each probe being biased against a respective surface of opposed parallel surfaces of said board, said contact probes monitoring both surfaces of said board to sense irregularities in the flatness of said surfaces along a measured length of said board, measurement means connected to said contact probes to provide a measurement signal representative of said sensed irregularities, a translatory device for measuring the distance of displacement of said board, said translatory device having circuit means to produce a reference signal at each one of predetermined intervals of length along said measured length to permit an electronic processing circuit means to obtain a measurement signal of said irregularities at each said reference signal.

15. A system as claimed in claim 14, wherein said contact probes are connected to a linear measuring device to provide a linear output signal, said linear output signal and said reference signals being connected to sampling circuit means to provide information signals corresponding to sample values of said linear output signal at each interval of said reference signals, said information signals being representative of the roughness of said board along said measured length, and processing circuit means to process said information and reference signals to provide a usable output of said information signals.

16. A system as claimed in claim 15, wherein said processing circuit means includes a microprocessor circuit having a storage circuit and programmed to store and convert from said information signals a desired digital output display signal representative of any one of the average, maximum, minimum board thickness measured, or the average board roughness, or the number of boards measured.

17. A system as claimed in claim 15, wherein said translatory device is a wheel-type element secured in said measurement device for frictional rolling contact with a surface of said board, a flat disc secured to said wheel-type element and rotatable therewith, said disc having light transmitting apertures in a surface thereof to pass a light beam therethrough at predetermined intervals along the circumference of said disc, a photocell detecting the passage of said beam through each said apertures to provide a reference signal each time said beam is detected.

18. A system as claimed in claim 17, wherein said wheel-type element is a cylindrical roll, said disc being secured about the circumference of said cylindrical roll.

19. A system as claimed in claim 14, wherein said means to displace a board relative to contact probe means is constituted by a hand-portable housing for said system, a pair of spaced apart rolls in said device rotatably supported on a surface of said board and displaceable thereover by movement of said housing.

20. A system as claimed in claim 14, wherein said contact probes are contact point elements, each of said contact point elements having a rolling contact head displaceable on its respective surface of said board and a support end secured to a respective one of a pair of spaced support walls biased towards each other, a linear potentiometer transducer having opposed ends, each opposed end being a displaceable armature secured to a respective one of said support walls whereby transverse displacement of each said probes will be transferred to its respective armature of said potentiometer to produce said measurement signal representative of the displacement of both said probes and the irregularities in said surfaces.

* * * * *